(12) United States Patent
Sutter et al.

(10) Patent No.: US 7,225,471 B2
(45) Date of Patent: Jun. 5, 2007

(54) REMOVABLE OPTICAL ASSEMBLY FOR A HELMET

(75) Inventors: Brad Sutter, Exeter, PA (US); Michael Fenton, Forest City, PA (US)

(73) Assignee: Gentex Corporation, Carbondale, PA (US)

( * ) Notice: Subject to any disclaimer, the term of this patent is extended or adjusted under 35 U.S.C. 154(b) by 203 days.

(21) Appl. No.: 10/898,515

(22) Filed: Jul. 23, 2004

(65) Prior Publication Data

US 2006/0015979 A1   Jan. 26, 2006

(51) Int. Cl.
    *A42B 3/22*   (2006.01)
(52) U.S. Cl. .................................... 2/6.4; 2/6.5; 2/424
(58) Field of Classification Search ................. 2/6.1,
    2/6.2, 6.3, 6.4, 6.5, 6.7, 422, 424, 429, 427,
    2/410; 359/409, 815; 224/181; 403/252,
    403/253, 254, 263; 248/225.11
    See application file for complete search history.

(56) References Cited

U.S. PATENT DOCUMENTS

| | | | |
|---|---|---|---|
| 3,878,589 A * | 4/1975 | Schaefer ....................... 24/669 |
| 4,199,823 A * | 4/1980 | Jenkins et al. .................. 2/424 |
| 4,621,377 A * | 11/1986 | Pennell .......................... 2/6.4 |
| 4,794,652 A * | 1/1989 | Piech von Planta et al. ..... 2/414 |
| 4,907,296 A * | 3/1990 | Blecha ........................... 2/6.2 |
| 4,918,752 A * | 4/1990 | Briggs ............................. 2/6.2 |
| 4,929,116 A * | 5/1990 | Mahl ........................... 403/263 |
| 5,026,016 A * | 6/1991 | Lisowski ..................... 248/314 |
| 5,113,525 A | 5/1992 | Hedges et al. |
| 5,184,231 A * | 2/1993 | Ellis .............................. 359/13 |
| 5,226,181 A | 7/1993 | Polednak et al. |
| 5,230,101 A | 7/1993 | Hedges et al. |
| 5,301,372 A * | 4/1994 | Matoba .......................... 2/424 |
| 5,329,642 A * | 7/1994 | Dampney ...................... 2/424 |
| 5,396,661 A | 3/1995 | Sutter et al. |
| 5,623,730 A * | 4/1997 | Baudou et al. ................. 2/6.2 |
| 5,646,785 A * | 7/1997 | Gilboa et al. ............... 359/632 |
| 5,742,937 A * | 4/1998 | Baudou et al. ................. 2/6.3 |
| 5,752,276 A * | 5/1998 | Baudou et al. ................... 2/63 |
| 6,301,720 B1 * | 10/2001 | Bataille et al. ................ 2/422 |
| 6,622,313 B1 * | 9/2003 | Choi et al. ..................... 2/424 |
| 6,662,370 B1 * | 12/2003 | Buchanan, Jr. ................. 2/6.2 |
| 6,795,977 B2 * | 9/2004 | Basson et al. ................. 2/422 |
| 6,820,285 B2 * | 11/2004 | Bataille et al. ................ 2/422 |
| 6,981,623 B2 * | 1/2006 | Iitsuka ....................... 224/197 |
| 2001/0054188 A1 * | 12/2001 | Guay et al. ..................... 2/6.4 |
| 2002/0020004 A1 * | 2/2002 | Beautz ........................... 2/422 |

FOREIGN PATENT DOCUMENTS

DE   4215978 A1 * 11/1993
EP   628261 A1 * 12/1994

* cited by examiner

*Primary Examiner*—Rodney M. Lindsey
(74) *Attorney, Agent, or Firm*—Keusey, Tutunjian & Bitetto, P. C.

(57) ABSTRACT

There is provided a removable optical assembly for a helmet. The removable optical assembly includes an optical device retention system and an optical device attachment assembly. The optical device retention system is adapted to couple to the helmet and has an optical device receiving portion. The optical device attachment assembly has a latching mechanism. The latching mechanism is adapted to releasably latch the optical device attachment assembly to the optical device receiving portion. The optical device retention system further has a deflection flange adjacent the optical device receiving portion for deflecting extraneous elements over the optical device receiving portion and the latching mechanism.

59 Claims, 8 Drawing Sheets

REMOVABLE OPTICAL ASSEMBLY FOR A HELMET

BACKGROUND OF THE INVENTION

1. Field of the Invention

The present invention generally relates to helmets and, more particularly, to a removable optical assembly for a helmet. The removable optical assembly may include, but is not limited to, visor assemblies (having one or more visors), and mounts for optical devices such as Night Vision Goggles (NVGs), and thermal imaging devices.

2. Background of the Invention

Various helmet visor assemblies are known in the prior art. Such helmet visor assemblies include bungee visors, tracked visors, and rotational visors. Some of the helmet visor assemblies have been implemented to include a single visor and others to include a dual visor. However, no such helmet visor assemblies exist that are capable of withstanding high wind forces up to and exceeding 600 knots and that also allow for the visor portion to be interchanged or swapped out for replacement by a mount, e.g., to receive a Night Vision Goggle (NVG) or a thermal imaging device.

Accordingly, it would be desirable and highly advantageous to have an optical assembly that at least overcomes the above-described problems of the prior art.

SUMMARY OF THE INVENTION

The problems stated above, as well as other related problems of the prior art, are solved by the present invention, a removable optical assembly for a helmet.

According to an aspect of the present invention, there is provided a removable dual visor kit for a helmet. The removable dual visor kit includes two retaining assemblies and a visor assembly. The two retaining assemblies are each adapted to couple to the helmet and have a latch-receiving portion. The visor assembly has two visors and two latches. Each of the two latches is adapted to couple to and release from the latch-receiving portion of one of the two retaining assemblies. Each of the two latches is further adapted to allow one-handed raising and lowering of a respective one of the two visors.

According to another aspect of the present invention, there is provided a removable optical assembly for a helmet. The removable optical assembly includes an optical device retention system and an optical device attachment assembly. The optical device retention system is adapted to couple to the helmet and has an optical device receiving portion. The optical device attachment assembly has a latching mechanism. The latching mechanism is adapted to releasably latch the optical device attachment assembly to the optical device receiving portion. The optical device retention system further has a deflection flange adjacent the optical device receiving portion for deflecting extraneous elements over the optical device receiving portion and the latching mechanism.

According to yet another aspect of the present invention, there is provided a removable visor kit for retrofitting to an existing non-visored helmet. The removable visor kit includes an optical device retention system and a visor assembly. The optical device retention system is adapted for retrofitting to the existing non-visored helmet. The optical device retention system has an optical device receiving portion. The visor assembly has a latching mechanism adapted to manually couple and release the visor assembly to and from the optical device receiving portion.

According to a further aspect of the present invention, there is provided a removable optical assembly for a helmet. The removable optical assembly includes an optical device mounting system and a tool-less latching system. The optical device mounting system is adapted to couple to the helmet and to provide at least one mounting base for an optical device on an exterior of the helmet. The tool-less latching system is adapted to couple and release the optical device to and from the at least one mounting base of the optical device mounting system manually without tools. The optical device mounting system further has a deflection flange adjacent the at least one mounting base for deflecting extraneous elements over the at least one mounting base and the tool-less latching system.

According to an additional aspect of the present invention, there is provided a removable optical assembly mounting kit for retrofitting to an existing non-optically enhanced helmet. The removable optical assembly mounting kit includes an optical device mounting system and a tool-less latching system. The optical device mounting system is adapted to couple to the helmet and to provide at least one mounting base for an optical device on an exterior of the helmet. The tool-less latching system is adapted to couple and release the optical device to and from the at least one mounting base of the optical device mounting system manually without tools. The optical device mounting system further has a deflection flange for deflecting extraneous elements over the optical device mounting system and the tool-less latching system.

These and other aspects, features and advantages of the present invention will become apparent from the following detailed description of preferred embodiments, which is to be read in connection with the accompanying drawings.

DETAILED DESCRIPTION OF THE INVENTION

Figure 1:
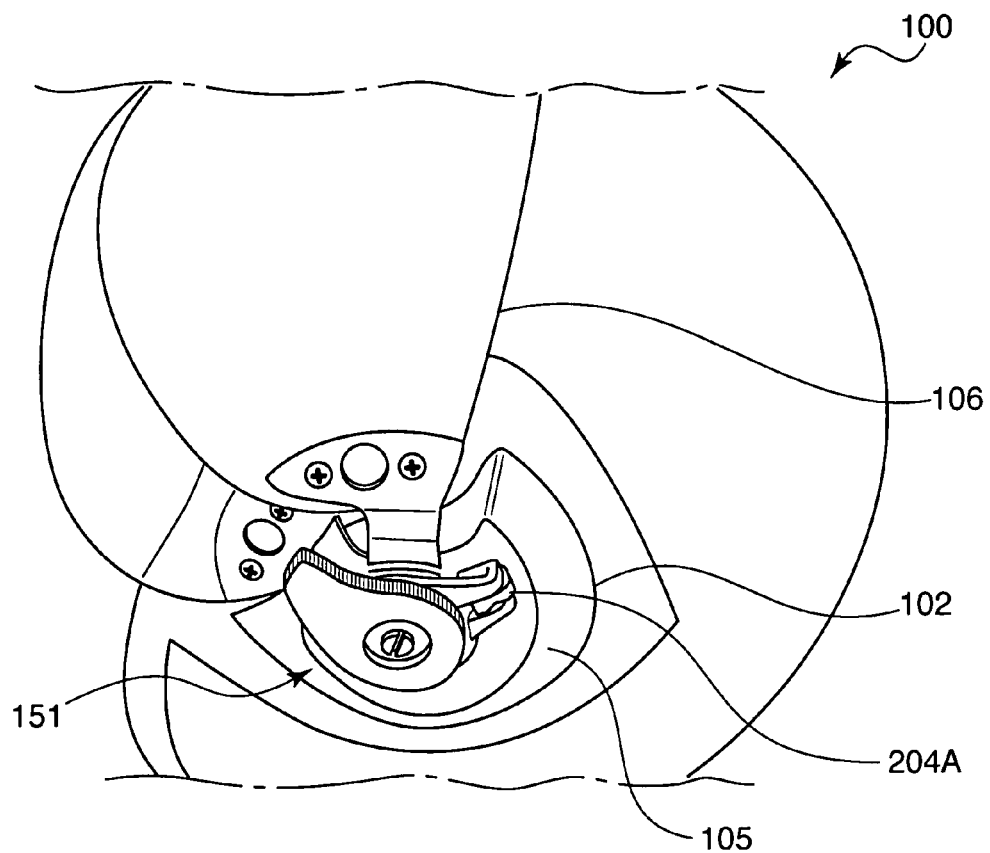
FIGS. 1–3 are diagrams illustrating a removable Dual Visor Kit (DVK) 100 for a helmet, according to an illustrative embodiment of the present invention.

The present invention is directed to a removable optical assembly for a helmet. Advantageously, the present invention allows a helmet wearer to readily switch between different optical devices so as to allow the wearer to adapt to different missions or different mission conditions. The optical devices include, but are not limited to, visor assemblies (having one or more visors), Night Vision Goggles (NVGs), and thermal imaging devices. The present invention provides secure mounts on the helmet for the different optical devices, and allows for one-handed removal and installation of each side of an optical device from the mounts. Moreover, the present invention allows for one-handed actuation of the optical devices so that, for example, a user may raise or lower one of two visors in a dual visor assembly using only one hand or the user may raise or lower an NVG with respect to a position directly in front of the eyes of the user. Further, it is to be appreciated that the present invention may be incorporated into a helmet at the time of manufacture of the helmet or may be retrofitted to an existing helmet. These and many other attendant advantages of the present invention will become apparent to one of ordinary skill in the related art, given the teachings of the present invention provided herein.

For illustrative purposes, the present invention is more fully described hereinafter with respect to a visor assembly having two visors (hereinafter also referred to as a removable "Dual Visor Kit" (DVK)). However, as noted above, the present invention is not limited to solely visor assemblies and may be implemented with respect to any optical device that may be needed by a helmet wearer for a variety of mission scenarios.

Advantageously, the removable DVK allows for a helmet to be fitted (or retrofitted) with an inner visor and an outer visor. The mounting arrangement of the DVK allows the DVK to withstand high velocity windblasts up to and exceeding 600 Knots. Moreover, the entire mounting platform of the DVK is rigid, thereby providing a superior mounting platform.

Further, since the actual mounting platform of the DVK is removable, other devices (e.g., Night Vision Goggles (NVGs), thermal imaging devices, etc.) can be mounted at substantially the same location on the helmet. It is to be appreciated that the design of the DVK allows for one-handed installation and removal of each side of the visor assembly (i.e., one side at a time using only one hard) formed by the inner and outer visors, to allow a wearer to easily swap-out any assembly (e.g., Night Vision Goggle (NVG), thermal imaging device, etc.) attached to the helmet that uses the mounting arrangement of the present invention.

Moreover, the removable DVK advantageously allows for selective, single-handed raising and lowering of any of the visors. In this way, the user may easily and single-handedly invoke or withdraw any of the functions represented by the visors (e.g., laser shield, sun shield, etc.). Advantageously, the visors may be (friction) "locked" in whatever position a user desires, thereby providing flexibility in the possible positions of the visors.

It is to be appreciated that the two different visors provided by the present invention allow for a variety of conditions to be addressed. For example, any one of the inner visor or outer visor may be a laser visor, a dust visor, a ballistic visor, a sun visor, and so forth. In fact, the inner visor may be used to protect against lasers of a pre-determined wavelength or range of wavelengths, and the outer visor may be used to protect against lasers of a different pre-determined wavelength or range of wavelengths.

Figure 2:
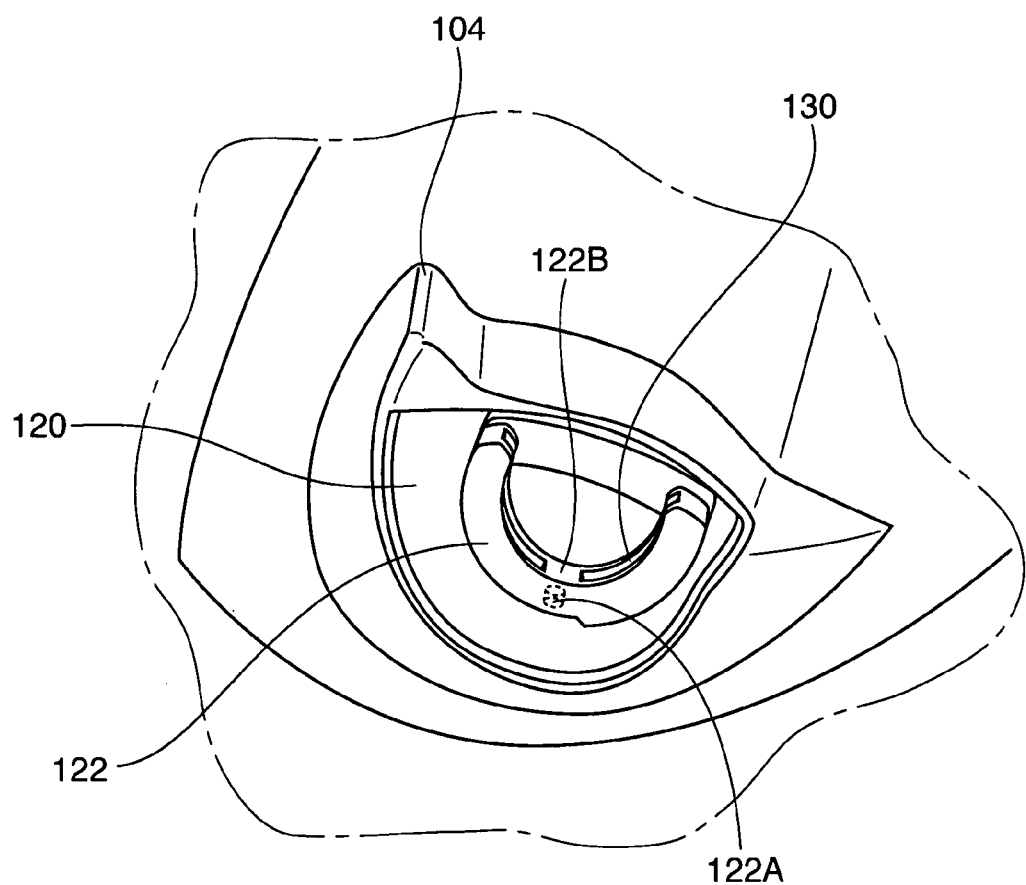
Figure 3:
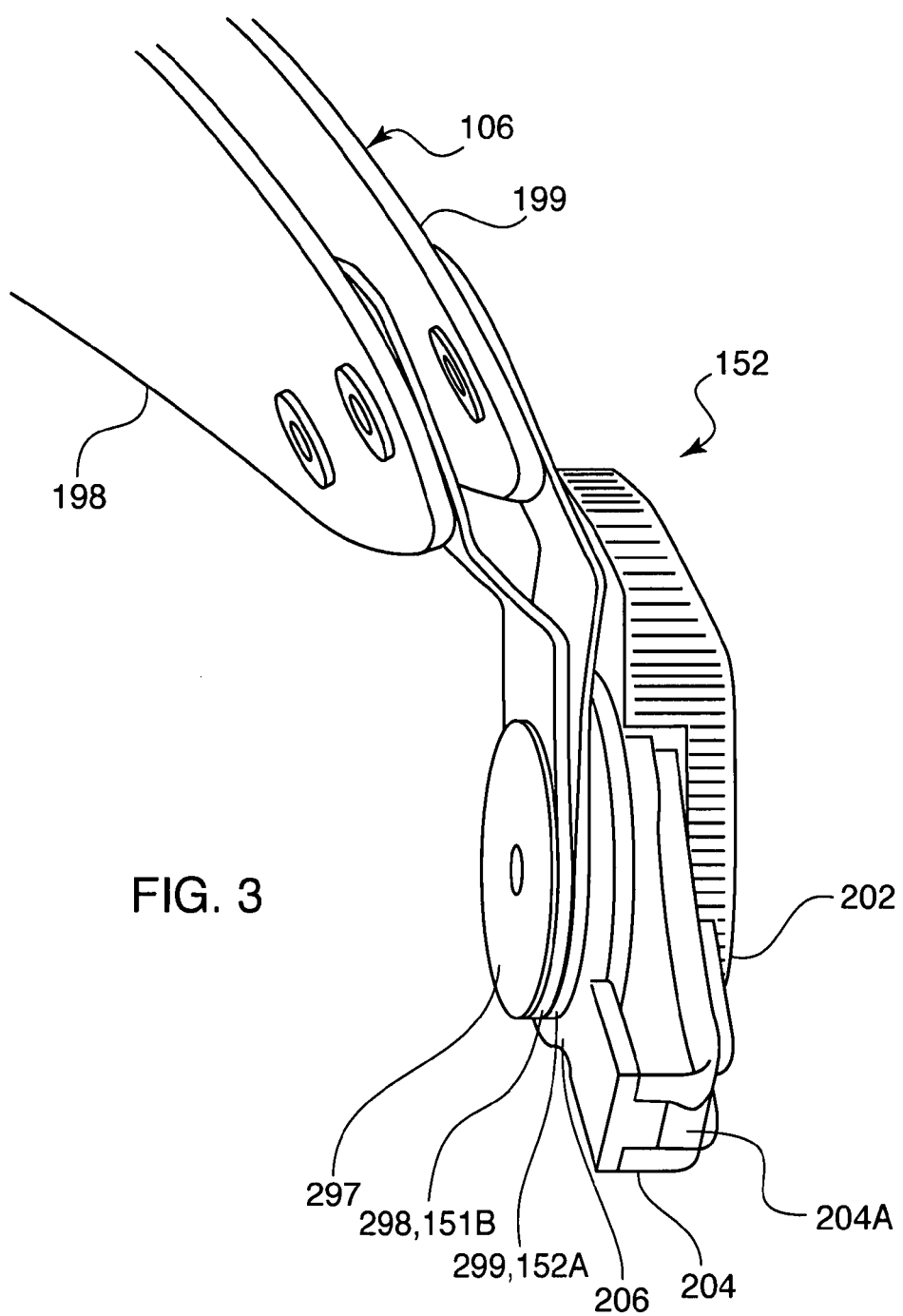
Figure 4:
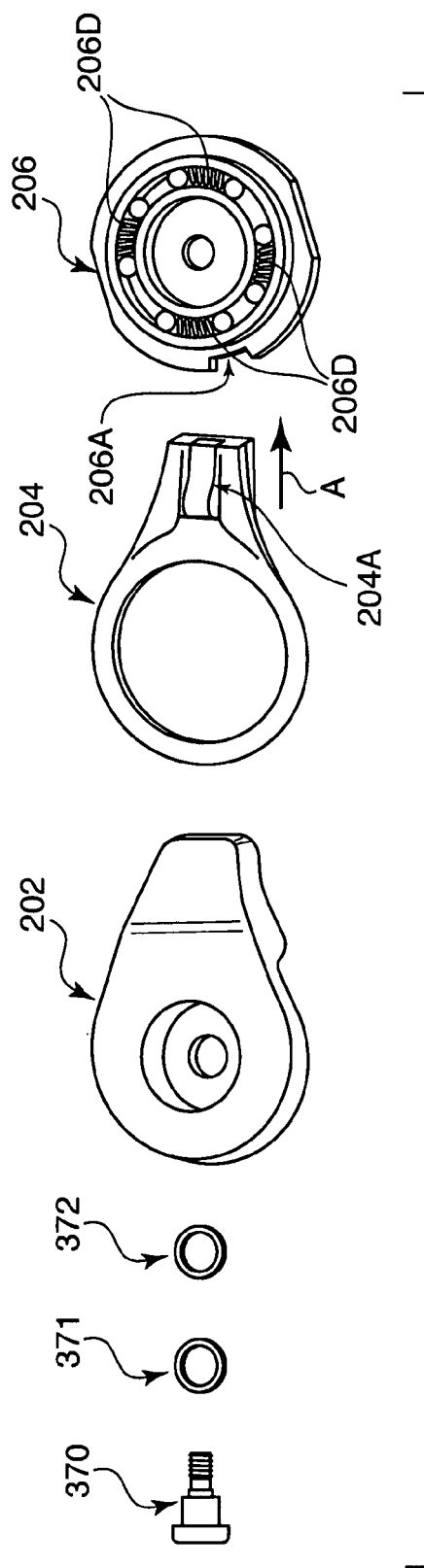
FIGS. 4–7 are diagrams further illustrating various aspects of the visor assembly 106, according to an illustrative embodiment of the present invention.
Figure 5:
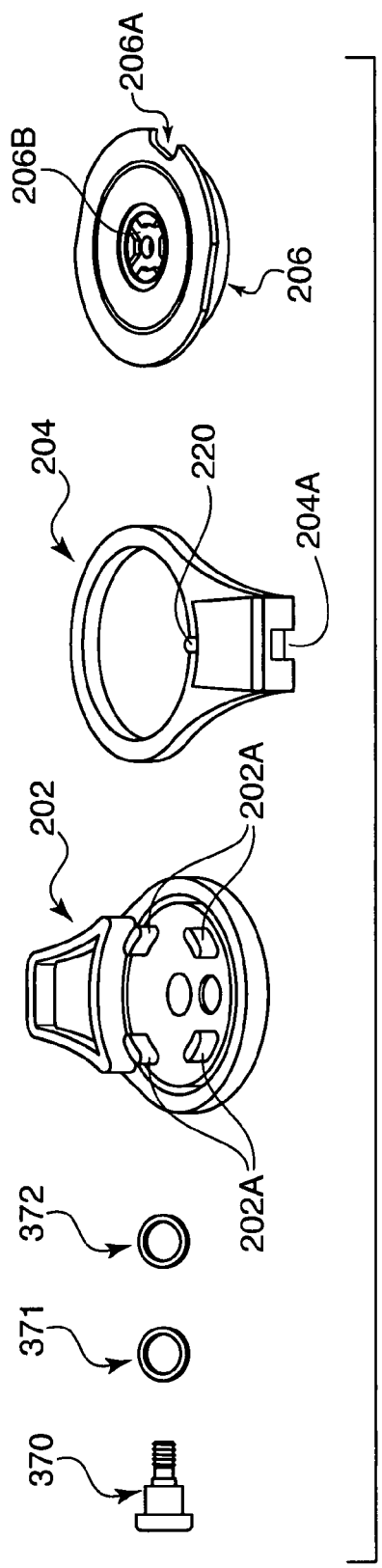
Figure 6:
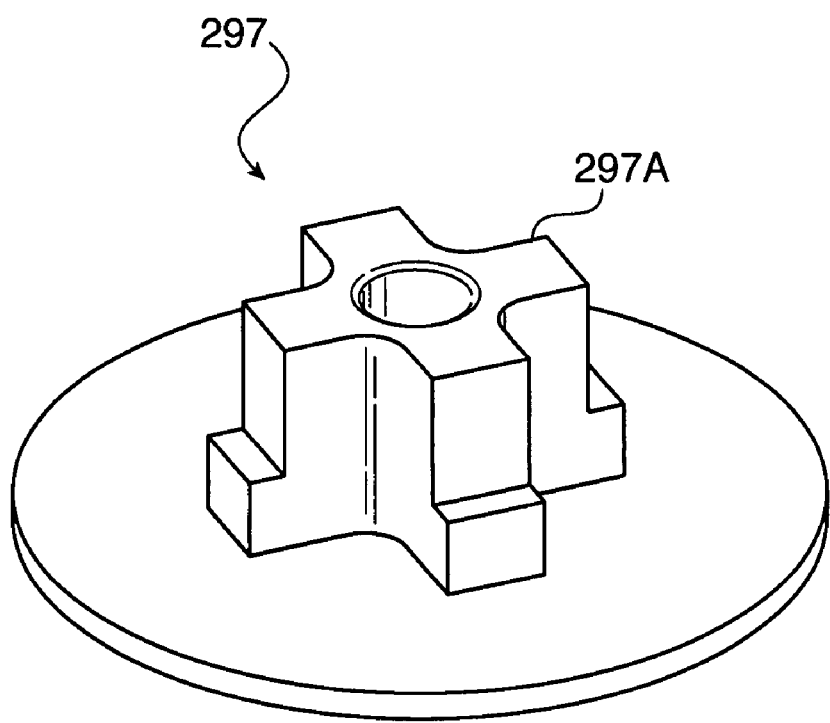
Figure 7:
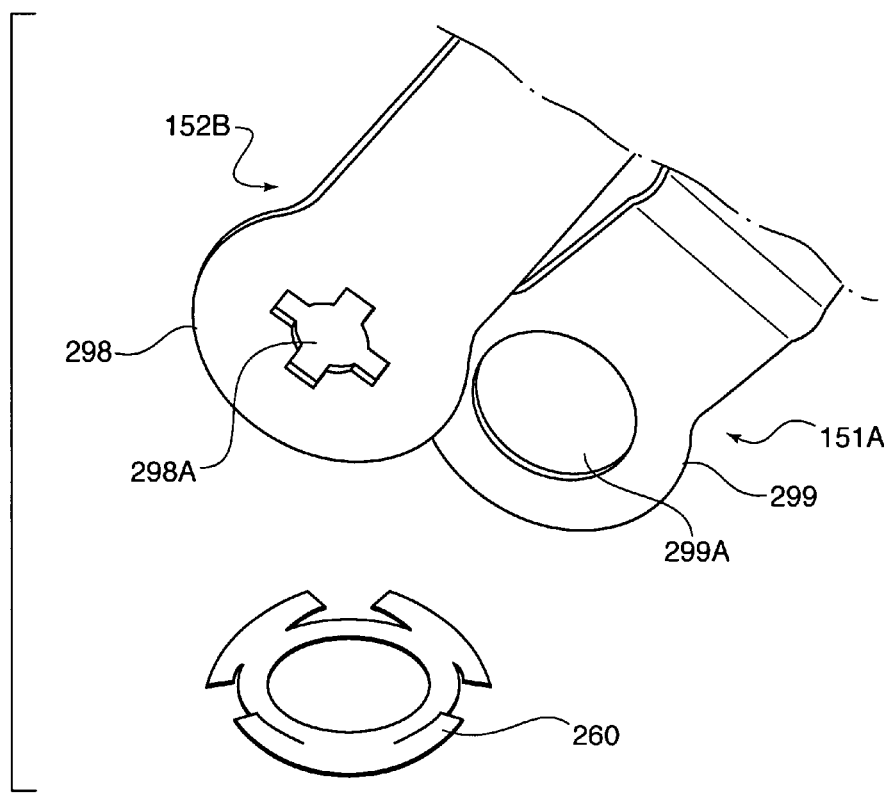

FIGS. 1–3 are diagrams illustrating a removable Dual Visor Kit (DVK) 100 for a helmet, according to an illustrative embodiment of the present invention.

The removable DVK 100 includes a first retaining assembly 102, a second retaining assembly 104, and a visor assembly 106. The visor assembly 106 is coupled to the helmet via the first retaining assembly 102 and the second retaining assembly 104.

The first retaining assembly 102 and the second retaining assembly 104 are attached to the helmet using one or more connecting devices (not shown). The connecting devices include, but are not limited to, screws, rivets, and so forth.

Each of the first retaining assembly 102 and the second retaining assembly 104 include a track portion 120 and a latch-receiving portion 122.

It is to be appreciated that the first retaining assembly 102 and the second retaining assembly 104 are both adapted to have a non-snagging tapered profile i.e., deflection flange 105, with respect to the outer circumference of the helmet. In this way, parachute lines and other items are prevented from snagging onto any portion of the first retaining assembly 102 and the second retaining assembly 104 (as well as the corresponding first 151 and second latches 152 described hereinafter).

The visor assembly 106 includes a first latch 151 and a second latch 152. The first latch 151 and the second latch 152 couple to the latch-receiving portions 122 of the first retaining assembly 102 and the second retaining assembly 104, respectively. The latch-receiving portions 122 are adapted to provide a positive connection point for the latches 151 and 152. The latch-receiving portions 122 each include a slot 130 for receiving portions of the visor assembly 106, as further described herein below with respect to FIG. 2.

The visor assembly 106 also includes a first visor (also interchangeably referred to herein as "inner visor") 198 and a second visor (also interchangeably referred to herein as "outer visor") 199. The visor assembly 106, when coupled to the first retaining assembly 102 and the second retaining assembly 104, is adapted to allow the first visor 198 and the second visor 199 to be raised and lowered as desired. That is, the wearer is afforded an infinite adjustment of the positions of the first visor 198 and the second visor 199, as opposed to a full-up or full-down approach.

FIGS. 4–7 are diagrams further illustrating various aspects of the visor assembly 106, according to an illustrative embodiment of the present invention.

The first latch 151 and the second latch 152 each include an outer portion 202, an intermediate portion 204, and an inner portion 206.

Each of the outer portions 202 respectively controls one of the first visor 198 or the second visor 199 to allow one-handed operation thereof, as explained in further detail herein below.

Each of the intermediate portions 204 includes a tab 204A for releasing the visor assembly 106 from the first retaining assembly 102 and the second retaining assembly 104. The tabs 204A are in communication with a locking pawl 220 on the underside of the intermediate portion 204 (See FIG. 5). The tabs 204A, and the respective locking pawls 220 are spring loaded and biased to remain in an extended or locked position, which may be overcome by a wearer depressing the tabs 204A in the direction of arrow A (See FIG. 4).

Each of the inner portions 206 is adapted to fit within the slot 130 of one of the latch-receiving portions 122. The recess 206A engages the land 122B in the center of the slot 130. That is, each of the inner portions 206 is adapted to engage a corresponding one of the slots 130 so as to engage the overall visor assembly 106 to the first retaining assembly 102 and the second retaining assembly 104. Once the inner portions 206 are engaged to the slots 130, the intermediate portions 204 are rotated until the locking pawls 220 of tabs 204A of the intermediate portions 204 snap into the locked position within a recess 122A disposed in each of the latch receiving portions 122 of retaining assemblies 102 and 104. In this way, the visor assembly 106 is locked to the first retaining assembly 102 and the second retaining assembly 104 until a wearer decides to remove the visor assembly 106 (by depressing the tab 204A and rotating the intermediate portions 204 until the inner portions 206 are capable of being removed from the slots 130).

Each of the inner portions 206 also includes a plurality of ball bearing and spring sets 206D for providing a "friction lock" to maintain a user selected position of the visors. Each of the outer portions 202 further includes a plurality of projections 202A that are respectively disposed in between the ball bearing and spring sets 206D for locking and unlocking the friction lock. To allow a user to move a corresponding visor to a desired position, the user must first slightly rotate the corresponding outer portion 202, so that the corresponding projections 202A disengage the corresponding friction lock (relating to the plurality of ball bearing and spring sets 206D), at which point the user may further rotate the corresponding outer portion 202 to move the visor to the actual desired position. It is to be appreciated that the unlocking of the friction lock and the positioning of the corresponding visor can all be performed using only one hand, and actuating only one element (i.e., the outer portion 202). Various aspects of these elements and the operations thereof are further described in U.S. Pat. No. 5,396,661, entitled "Helmet Visor Operating Mechanism", issued on Mar. 14, 1995, assigned to the assignee herein, and incorporated herein by reference thereto.

The first (or inner) visor 198 is attached to a first visor attachment 151A and a second visor attachment 151B. The second (or outer) visor 199 is attached to a first visor attachment 152A and a second visor attachment 152B. The first visor attachment 151A has an end 299 and the second visor attachment 151B has an end 298. The second visor attachment 152B has an end 298 and the second visor attachment 152A has an end 299. Note that the ends 298 and 299 are arranged on opposite sides for each visor. The ends 298 have an aperture 298A with a pre-specified shape at their respective centers. The ends 299 have a substantially circular aperture 299A at their respective centers.

The first visor 198 and the second visor 199 are separated by a washer 260, and are all coupled together and to the outer portions 202, the intermediate portions 204 and the inner portions 206, via screws 370, corresponding washers 371 and 372, and cap portions 297, to form the visor assembly 106. The cap portions 297 are circular in shape and each includes a projection 297a of the same pre-specified shape as that of the apertures of the ends 298. Each of the inner portions 206 includes a cutout 206B, also of the pre-specified shape, and substantially centrally located, for mating with the projections 297a of the cap portions 297.

Since each of the two visors is operatively coupled to a corresponding one of the inner portions 206 (via the apertures 298A of ends 298, the projections 297A of the cap portions 297, and the cutouts 206B of the inner portions 206, the rotation of any of the inner portions 206 also raises or lowers a corresponding one of the two visors. As noted above, the outer portion 202 of the corresponding visor has to be rotated slightly to disengage the corresponding friction lock formed from the plurality of ball bearings and spring sets 206D in the corresponding inner portion 206, so that the visor can then be rotated by further rotation of the outer portion 202. In this way, a wearer may simply use one hand to raise or lower any one of the two visors.

It is to be appreciated that while the present invention is described with respect to a dual visor assembly, the present invention may also be implemented with respect to a single visor assembly. Moreover, the first and second retaining assemblies 102, 104 and the first and second latches 151, 152 may be utilized with respect to any other optical device including, but not limited to, Night Vision Goggles (NVGs) and thermal imaging devices. In this way, a helmet wearer may be assigned a single helmet with multiple optical devices (e.g., single and/or dual visor assemblies, an NVG, a thermal imaging device, etc.), and may easily and readily remove one optical device (e.g., sun/laser dual visor) for replacement by another optical device (e.g., NVG). Accordingly, the present invention allows the helmet wearer to adapt his or her optical capabilities to changing missions and mission environments.

It is to be appreciated that in some embodiments of the present invention, a separate pair of the first and second latches 151, 152 may be included in each optical device (e.g., one pair of latches 151, 152 for a dual visor assembly and another pair of latches 151, 152 for an NVG). It is to be further appreciated that in other embodiments of the present invention, the first and second latches 151, 152 may be implemented such that only one set is issued with the single helmet, and the latches would then attached to the current optical device to be attached to the helmet. That is, the first and second latches 151, 152 would be reused for a plurality of optical devices so that only one helmet equipped with one set (pair) of latches is assigned to a particular user. One of ordinary skill in the related art can readily contemplate many ways in which the latches can be implemented so as to couple to the helmet and also to the optical devices themselves, thereby providing further modularity and reuse of existing parts. In such a case, it is preferable but not mandatory that the latches are adapted to couple to the optical device without tools, just as the latches are adapted to couple to the helmet without tools, so as to allow a user to readily configure and re-configure their helmet on an as-needed basis without tools and undue complexity.

Moreover, it is to be further appreciated that while the present invention is described with respect to latches capable of providing rotary motion to adjust the position of the optical devices (e.g., visors), other embodiments of the present invention may include latches that do not rotate when coupled to the latch-receiving portions on the helmet. For example, an NVG may be coupled to the latch-receiving portions using a bar mount with latches that do not rotate, so that the bar mount has a fixed position once it is mounted to the latch-receiving portions. To allow the NVG to rotate out of the line of sight of the helmet wearer, a pivoting joint or a mount capable of accepting a pivoting joint already disposed on the NVG is provided on the bar mount. As is readily contemplated by one of ordinary skill in the related art, the rotational elements included in the latches may be omitted so as to remove the rotating capability, while still providing the capability of switching between multiple optical devices, all while maintaining the spirit of the present invention.

Figure 8:
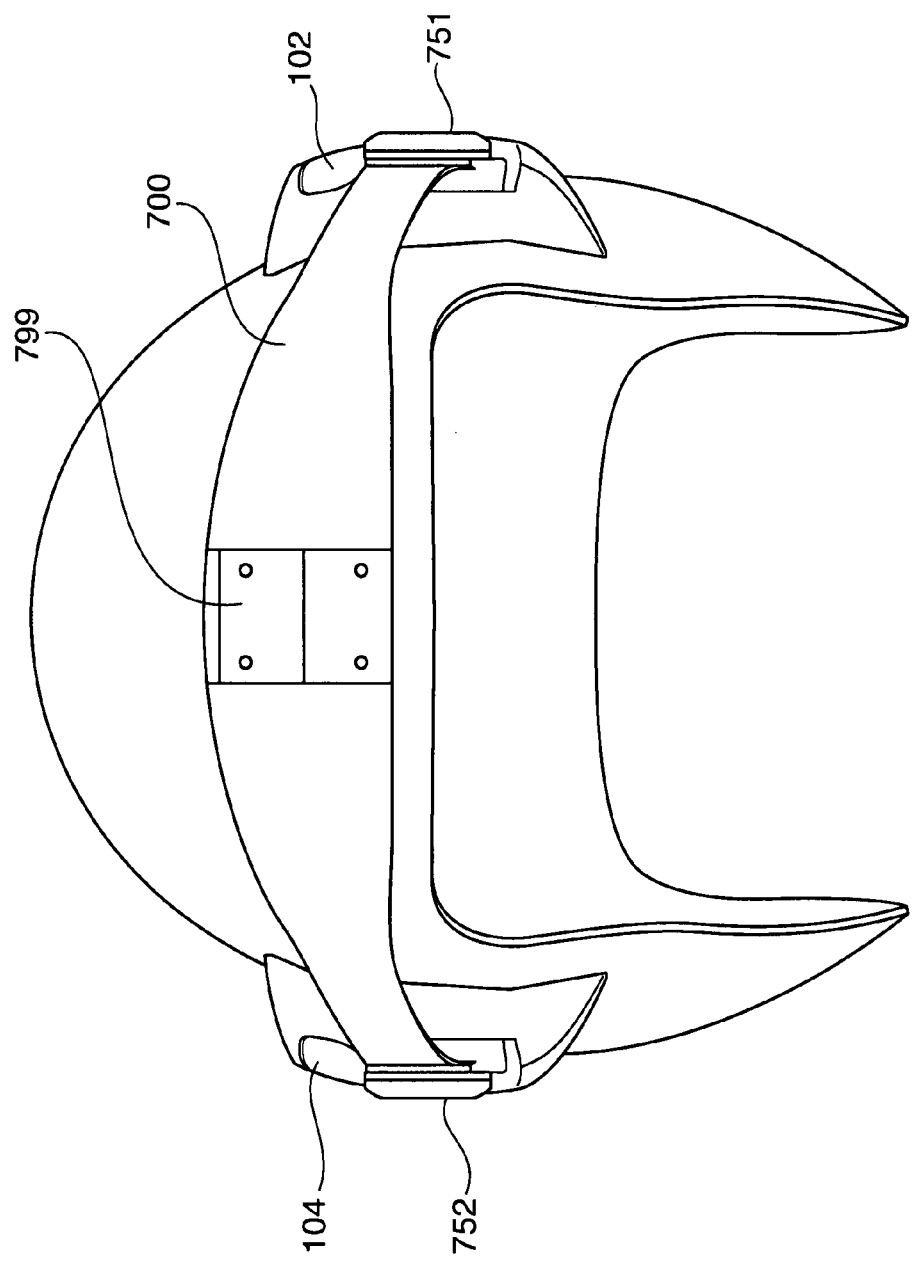
FIG. 8 is a diagram illustrating a bar mount 700 for a Night Vision Goggle (NVG), according to an illustrative embodiment of the present invention.

FIG. 8 is a diagram illustrating a bar mount 700 for a Night Vision Goggle (NVG), according to an illustrative embodiment of the present invention. The bar mount 700 has a first end 701 and a second end 702. A first non-rotating latch 751 is coupled to the first end 701 of the bar mount 700, and a second non-rotating latch 752 is coupled to the second end 702 of the bar mount 700. The bar mount 700 includes an NVG mount receiving portion 799 for providing a location on the bar mount 700 for coupling a pivoting joint (not shown) thereto. The pivoting joint is also coupled to the NVG (not shown) to allow the NVG to pivot in and out of the line of sight of the helmet wearer. It is to be appreciated that the first non-rotating latch 751 advantageously couples to the first retaining assembly 102 and the second non-rotating latch 752 couples to the second retaining assembly 104 (in particular, the latch-receiving portions 122 of the assemblies 102 and 104), thereby providing the capability of readily switching between, e.g., a dual visor assembly (e.g., as shown in FIG. 1) or an NVG assembly, using the same helmet mounts (e.g., the first retaining assembly 102 and the second retaining assembly 104 on the same helmet).

Although the illustrative embodiments have been described herein with reference to the accompanying drawings, it is to be understood that the present invention is not limited to those precise embodiments, and that various other changes and modifications may be effected therein by one of ordinary skill in the related art without departing from the scope or spirit of the invention. All such changes and modifications are intended to be included within the scope of the invention as defined by the appended claims.

What is claimed is:

1. A removable dual visor kit for a helmet, comprising:
   two retaining assemblies, each adapted to couple to the helmet and having a latch-receiving portion; and
   a visor assembly having two visors and two latches, each of the two latches adapted to couple to and release from the latch-receiving portion of one of the two retaining assemblies, each of the two latches having (i) an intermediate portion that includes a tab and a locking pawl in communication with and being actuated by said tab, said locking pawl having a locked position and an unlocked position; and (ii) and outer portion coupled to a respective visor for one-handed raising and lowering of a respective one of the two visors.

2. The removable dual visor kit of claim 1, wherein each of the two retaining assemblies is further adapted to respectively provide one of two positive latching points for a Night Vision Goggle (NVG) attachment assembly.

3. The removable dual visor kit of claim 2, wherein the NVG attachment assembly comprises:
   a mounting bar having a first end and a second end; and
   a first non-rotating latch and a second non-rotating latch, respectively disposed at the first end and the second end of the mounting bar, each adapted to couple to and release from the latch-receiving portion of one of the two retaining assemblies, and
   wherein the first non-rotating latch and the second non-rotating latch provide a stationary position for the mounting bar in relation to the helmet, when the first non-rotating latch and die second non-rotating latch are latched to the latch-receiving portion of the two retaining assemblies.

4. The removable dual visor kit of claim 3, wherein the mounting bar of the NVG attachment assembly includes an NVG mount-receiving portion adapted to receive an NVG mount.

5. The removable dual visor kit of claim 1, wherein each of the two latches is respectively adapted for one-handed latching to, and one-handed unlatching from, the latch-receiving portion of one of the two retaining assemblies.

6. The removable dual visor kit of claim 1, wherein the latch-receiving portion of each of the two retaining assemblies includes a recess, the locking pawl for engaging the recess in the locked position so as to couple a corresponding one of die two latches to die latch-receiving portion of a corresponding one of the two retaining assemblies.

7. The removable dual visor kit of claim 6, wherein the locking pawl is biased to remain in the locked position.

8. The removable dual visor kit of claim 6, wherein the latch-receiving portion of each of Pie two retaining assemblies includes a slot and each of the two latches comprise an inner portion adapted to fit within the slot.

9. The removable dual visor kit of claim 8, wherein the slot of Pie latch-receiving portion of each of the two retaining assemblies comprises a land, and the inner portion of each of the two latches includes another recess for engaging die land, such that the each of the two latches is positively latched to the slot of the latch-receiving portion of a respective one of the two retaining assemblies when The inner portion is within the slot, the locking pawl is within the recess, and the land is engaged with the other recess.

10. The removable dual visor kit of claim 1, wherein the latch-receiving portion of each of the two retaining assemblies includes a slot, and each of the two latches comprise an inner portion adapted to fit within the slot of the latch receiving portion of a corresponding one of the two retaining assemblies.

11. A removable optical assembly for a helmet, comprising:
    an optical device retention system adapted to couple to the helmet and having an optical device receiving portion comprising a latch-receiving portion including a slot; and
    an optical device attachment assembly having a latching mechanism comprising an inner portion, adapted to releasably latch into the slot,
    wherein the optical device retention system further has a tapered deflection flange adjacent the optical device receiving portion for providing a non-snagging profile and thereby deflecting extraneous elements over the optical device receiving portion and the latching mechanism.

12. The removable optical assembly of claim 11, further comprising a visor assembly connected to the optical device attachment assembly.

13. The removable optical assembly of claim 12, wherein The visor assembly comprises two visors.

14. The removable optical assembly of claim 13, wherein said latching system is further adapted to allow one-handed raising and one-handed lowering of a respective one of the two visors.

15. The removable optical assembly of claim 12, wherein the latching mechanism is further adapted to allow the visor assembly to rotate along an arc when the latching mechanism is in a locked position with respect to the optical device receiving portion.

16. The removable optical assembly of claim 11, wherein the optical device attachment assembly comprises a Night Vision Goggle (NVG) mount.

17. The removable optical assembly of claim 11, wherein the optical device attachment assembly comprises a thermal imaging device mounting assembly.

18. The removable optical assembly of claim 11, wherein the optical device receiving portion comprises two latch-receiving portions, and the latching mechanism comprises two latches adapted to couple to and release from the two latch-receiving portions.

19. The removable optical assembly of claim 18, wherein at least one of the two latches is further adapted to allow one-handed operation of an optical device connected thereto.

20. The removable optical assembly of claim 18, wherein the optical device comprises a visor assembly having two visors, and wherein each of the two latches comprise an outer portion, operatively coupled to a respective one of the two visors, adapted to allow one-handed raising and one-handed lowering of the respective one of the two visors.

21. The removable optical assembly of claim 18, wherein each of the two latches is adapted for one-handed latching to and one-handed unlatching from a respective one of the two latch-receiving portions.

22. The removable optical assembly of claim 18, wherein each of the two latch-receiving portions includes a recess, and each of the two latches comprise an intermediate portion that includes a tab and a locking pawl in communication with and being actuated by said tab, said locking pawl having a locked position and an unlocked position, the locking pawl for engaging the recess in the locked position so as to couple a corresponding one of the two latches to one of the two latch-receiving portions.

23. The removable optical assembly of claim 22, wherein the locking pawl is biased to remain in the locked position.

24. The removable optical assembly of claim 22, wherein each of the two latch-receiving portions includes a slot, and each of the two latches comprise an inner portion adapted to fit within the slot.

25. The removable optical assembly of claim 24, wherein the slot of each of the two latch-receiving portions comprises a land, and the inner portion of each of the two latches includes another recess for engaging the land, such that the each of the two latches is positively latched to the slot of a respective one of the two latch-receiving portions when the inner portion is within the slot, the tab is within the recess, and the land is engaged with the other recess.

26. The removable optical assembly of claim 11, wherein the helmet is an existing helmet without any supporting structure for optical devices, and wherein the optical device retention system is further adapted to be retrofitted to the existing helmet so as to add the optical device thereto.

27. The removable optical assembly of claim 11, wherein the optical device retention system is further adapted to respectively provide two positive latching points for a Night Vision Goggle (NVG) attachment assembly.

28. The removable optical assembly of claim 27, wherein the NVG attachment assembly comprises:
   a mounting bar having a first end and a second end; and
   a first non-rotating latch and a second non-rotating latch, respectively disposed at the first end and the second end of the mounting bar, each adapted to couple to and release from the optical device receiving portion of the optical device retention system, and
   wherein the first non-rotating latch and the second non-rotating latch provide a stationary position for the bar mount in relation to the helmet, when the first non-rotating latch and the second non-rotating latch are latched to the optical device receiving portion of the optical device retention system.

29. The removable optical assembly of claim 28, wherein the mounting bar of the NVG attachment assembly includes an NVG mount-receiving portion adapted to receive an NVG mount.

30. A removable optical assembly for a helmet, comprising:
   an optical device mounting system adapted to couple to the helmet and to provide at least one mounting base for an optical device on an exterior of the helmet having a slot; and
   a tool-less latching system comprising an inner portion adapted to couple and release the optical device to and from the slot of the at least one mounting base of the optical device mounting system manually without tools,
   wherein the optical device mounting system further has a tapered deflection flange adjacent the at least one mounting base for providing a non-snagging profile and thereby deflecting extraneous elements over the at least one mounting base and the tool-less latching system.

31. The removable optical assembly of claim 30, wherein the at least one mounting base is adapted to support more than one type of optical device.

32. The removable optical assembly of claim 30, wherein the optical device comprises at least one of a visor assembly.

33. The removable optical assembly of claim 30, wherein the at least one mounting base is capable of supporting any of a Night Vision Goggle (NVG) attachment assembly, and a thermal imaging device attachment assembly.

34. The removable optical assembly of claim 30, wherein the at least one mounting base comprises two mounting bases, and the latching system comprises two latches adapted to couple to and release from the two mounting bases.

35. The removable optical assembly of claim 34, wherein at least one of the two latches is further adapted to allow one-handed operation of the optical device.

36. The removable optical assembly of claim 34, wherein the optical device comprises a visor assembly having two visors, and wherein each of the two latches comprise an outer portion, operatively coupled to a respective one of the two visors, adapted to allow one-handed raising and one-handed lowering of the respective one of the two visors.

37. The removable optical assembly of claim 34, wherein each of the two latches is adapted for one-handed latching to and one-handed unlatching from a respective one of the two mounting bases.

38. The removable optical assembly of claim 34, wherein each of the two mounting bases includes a recess, and each of the two latches comprise an intermediate portion that includes a tab and a locking pawl in communication with and being releasable by said tab, said locking pawl having a locked position and an unlocked position, the locking pawl for engaging the recess in the locked position so as to couple a corresponding one of the two latches to one of the two mounting bases.

39. The removable optical assembly of claim 38, wherein the locking pawl is biased to remain in the locked position.

40. The removable optical assembly of claim 38, wherein the slot of each of the two mounting bases comprises a land, and the inner portion of each of the two latches includes another recess for engaging the land, such that the each of the two latches is positively latched to the slot of a respective one of the two mounting bases when the inner portion is within the slot, the locking pawl is within the recess, and the land is engaged with the other recess.

41. The removable optical assembly of claim 34, wherein the latching system comprises two latch-receiving portions each including a slot, and each of the two latches comprise an inner portion adapted to fit within the slot.

42. The removable optical assembly of claim 30, wherein the optical device mounting system is adapted to provide two mounting bases for a Night Vision Goggle (NVG) attachment assembly.

43. The removable optical assembly of claim 42, wherein the NVG attachment assembly comprises:
   a mounting bar having a first end and a second end; and
   a first non-rotating latch and a second non-rotating latch, respectively disposed at the first end and the second end of the mounting bar, each adapted to couple to and release from one of the two mounting bases of the optical device mounting system, and
   wherein the first non-rotating latch and the second non-rotating latch provide a stationary position for the mounting bar in relation to the helmet, when the first non-rotating latch and the second non-rotating latch are latched to the two mounting bases of the optical device mounting system.

44. The removable optical assembly of claim 43, wherein the mounting bar of the NVG attachment assembly includes an NVG mount-receiving portion adapted to receive an NVG mount.

45. A removable optical assembly mounting kit for retrofitting to an existing non-optically enhanced helmet, comprising:
   an optical device mounting system adapted to couple to the helmet and to provide at least one mounting base having a slot for an optical device on an exterior of the helmet; and
   a tool-less latching system having an inner portion adapted to couple and release the optical device to and from the slot of the at least one mounting base of the optical device mounting system manually without tools,
   wherein the optical device mounting system further has a tapered deflection flange for providing a non-snagging profile and thereby deflecting extraneous elements over the optical device mounting system and the tool-less latching system.

46. The removable optical assembly mounting kit of claim 45, wherein the at least one mounting base is adapted to support more than one type of optical device.

47. The removable optical assembly mounting kit of claim 45, wherein the optical device comprises at least one of a visor assembly.

48. The removable optical assembly mounting kit of claim 45, wherein the at least one mounting base is capable of supporting any of a Night Vision Goggle (NVG) attachment assembly, and a thermal imaging device attachment assembly.

49. The removable optical assembly mounting kit of claim 45, wherein the at least one mounting base comprises two mounting bases, and the latching system comprises two latches adapted to couple to and release from the two mounting bases.

50. The removable optical assembly mounting kit of claim 49, wherein at least one of the two latches is further adapted to allow one-handed operation of the optical device.

51. The removable optical assembly mounting kit of claim 49, wherein the optical device comprises a visor assembly having two visors, and wherein each of the two latches comprise an outer portion, operatively coupled to a respective one of the two visors, adapted to allow one-handed raising arid one-handed lowering of the respective one of the two visors.

52. The removable optical assembly mounting kit of claim 49, wherein each of the two latches is adapted for one-handed latching to and one-handed unlatching from a respective one of the two mounting bases.

53. The removable optical assembly mounting kit of claim 49, wherein each of the two mounting bases includes a recess, and each of the two latches comprise an intermediate portion that includes a tab and a locking pawl in communication with and being releasable by said tab, said locking pawl having a locked position and an unlocked position, the locking pawl for engaging the recess in the locked position so as to couple a corresponding one of the two latches to one of the two mounting bases.

54. The removable optical assembly mounting kit of claim 53, wherein the locking pawl is biased to remain in the locked position.

55. The removable optical assembly mounting kit of claim 53, wherein the slot of each of the two mounting bases comprises a land, and the inner portion of each of the two latches includes another recess for engaging the land, such that the each of the two latches is positively latched to the slot of a respective one of the two mounting bases when the inner portion is within the slot, the locking pawl is within the recess, and the land is engaged with the other recess.

56. The removable optical assembly mounting kit of claim 49, wherein each of the two latch-receiving portions includes a slot, and each of The two latches comprise an inner portion adapted to fit within The slot.

57. The removable optical assembly mounting kit of claim 45, wherein the optical device mounting system is adapted to provide two mounting bases for a Night Vision Goggle (NVG) attachment assembly.

58. The removable optical assembly mounting kit of claim 57, wherein the NVG attachment assembly comprises:
   a mounting bar having a first end and a second end; and
   a first non-rotating latch and a second non-rotating latch, respectively disposed at the first end and The second end of the mounting bar, each adapted to couple to and release from one of The two mounting bases of the optical device mounting system, and
   wherein the first non-rotating latch and the second non-rotating latch provide a stationary position for the mounting bar in relation to the helmet, when The first non-rotating latch and the second non-rotating latch are latched to The two mounting bases of The optical device mounting system.

59. The removable optical assembly mounting kit of claim 58, wherein the mounting bar of the NVG attachment assembly includes an NVG mount-receiving portion adapted to receive an NVG.

* * * * *

UNITED STATES PATENT AND TRADEMARK OFFICE
CERTIFICATE OF CORRECTION

| | | |
|---|---|---|
| PATENT NO. | : 7,225,471 B2 | Page 1 of 1 |
| APPLICATION NO. | : 10/898515 | |
| DATED | : June 5, 2007 | |
| INVENTOR(S) | : Brad Sutter and Michael Fenton | |

It is certified that error appears in the above-identified patent and that said Letters Patent is hereby corrected as shown below:

Column 7, line 39, delete "die" and substitute --the--
Column 7, line 54, delete "die" and substitute --the-- (two occurrences)
Column 7, line 59, delete "Pie" and substitute --the--
Column 7, line 63, delete "Pie" and substitute --the--
Column 7, line 66, delete "die" and substitute --the--
Column 8, line 1, delete "The" and substitute --the--
Column 8, line 29, delete "The" and substitute --the--
Column 11, line 46, delete "arid" and substitute --and--

Signed and Sealed this

Seventh Day of August, 2007

JON W. DUDAS
*Director of the United States Patent and Trademark Office*